Patented June 13, 1933

1,913,480

UNITED STATES PATENT OFFICE

HERMANN ESPIG, OF BITTERFELD, GERMANY, ASSIGNOR TO I. G. FARBENINDUSTRIE AKTIENGESELLSCHAFT, OF FRANKFORT-ON-THE-MAIN, GERMANY

MANUFACTURE OF SYNTHETIC SPINELS

No Drawing. Application filed January 9, 1930, Serial No. 419,752, and in Germany February 11, 1929.

This invention relates to improvements in the manufacture of synthetic spinels on the base of alumina and magnesia.

Synthetic spinels of this kind when produced according to a known process, have a greenish-blue colour and the stones thus obtained resemble in their appearance aquamarines and blue zircones. All the spinels when prepared in this manner however alter their appearance to their disadvantage when viewed in artificial light inasmuch as their beautiful greenish-blue or sage-green colour changes into a greyish green, and lighter stones become almost colourless. In contradistinction, the natural aquamarines and zircones show a more beautiful lustre in artificial light than in the day light.

The object of the present invention is to remove this disadvantage of the known process. This is effected by adding before the fusing process small quantities of titanic acid, say about 0.3 percent by weight, to the starting powdered mixture of alumina and magnesia containing, besides, the usual amounts of oxides of chromium, cobalt, vanadium either single or in combination for colouring purposes. When viewed in day-light, the additional content of titanic oxide does not perceptibly change the colour of the stones resembling aquamarines and zircones; but the discolouration of the stones, otherwise occuring in artificial light, does in this case not take place and the stones then assume a vivid greenish-blue hue.

Even when employing a starting mixture without any addition of the known colouring substances, the spinels obtained after the addition of titanic oxide alone appear in a blue hue resembling the colour of aquamarines, which colour, in artificial light, changes into a bluish-green.

Example 0.3 parts by weight of titanic oxide are added to a mixture of 92 parts of alumina, 8 parts of magnesia, 0.12 parts of chromic oxide, 0.025 parts of cobaltic oxide, said substances being all finely powdered. The mixture thus obtained is fused in any of the known appliances, for instance according to Verneuil's process, for obtaining synthetic precious stones by means of an oxy-hydrogen blow-pipe so as to produce a raw bulb, ready to be cut and polished.

I claim:

1. A synthetic spinel having a permanent aquamarine colour consisting of about 92 parts of alumina, 8 parts of magnesia, 0.12 parts of chromic oxide, 0.025 parts of cobaltic oxide and 0.3 parts of titanic oxide.

2. A composition of matter adapted to produce a synthetic spinel having a permanent aquamarine colour, consisting of a basic mixture of about 92 parts of alumina and about 8 parts of magnesia, and incorporated in said basic mixture approximately 0.12 parts of chromic oxide, 0.025 parts of cobaltic oxide, and 0.3 parts of titanic oxide.

In testimony whereof, I affix my signature.

HERMANN ESPIG.